United States Patent [19]
Salukvadze

[11] 3,811,161
[45] May 21, 1974

[54] ROTARY CUTTING TOOL

[76] Inventor: Viktor Samsonovich Salukvadze, 5 Parkovaya, 42, kv. 53, Moscow, U.S.S.R.

[22] Filed: Apr. 9, 1973

[21] Appl. No.: 349,081

Related U.S. Application Data

[63] Continuation of Ser. No. 239,507, March 30, 1972, abandoned.

[30] Foreign Application Priority Data
May 10, 1971 U.S.S.R............................ 1662886

[52] U.S. Cl. .............................................. 29/81 H
[51] Int. Cl. ............................................ B23p 25/00
[58] Field of Search ....... 29/81 H, 81 J, 81 L, 81 R; 51/334, 336; 15/198, 200

[56] References Cited
UNITED STATES PATENTS

| | | | |
|---|---|---|---|
| 2,058,229 | 10/1936 | Hodgkins | 29/81 H X |
| 2,608,034 | 8/1952 | Fromson | 51/336 |
| 2,767,413 | 10/1956 | Herrington | 29/81 H X |
| 3,343,195 | 9/1967 | Menges | 15/198 X |
| 3,566,551 | 3/1971 | Hall | 51/336 |
| 3,645,049 | 2/1972 | Freek et al. | 51/334 |

FOREIGN PATENTS OR APPLICATIONS

| | | | |
|---|---|---|---|
| 467,352 | 6/1937 | Great Britain | 15/198 |

Primary Examiner—Alfred R. Guest
Attorney, Agent, or Firm—Holman & Stern

[57] ABSTRACT

Radially arranged elastic cutting elements of the tool are fixed to one another with one of their ends, in a close proximity to which said cutting elements are forced against one another with their side surfaces, while with their opposite free ends said cutting elements adjoin the tool common cutting surface which is shaped as a surface of revolution; said free ends of the cutting elements, when in free state, are spaced on said common cutting surface some distance apart so that within the zone where the adjacent free ends of the cutting elements come in contact with each other due to one of them being deflected at the moment of cutting, said distance has the value which, when taken as the average one for all such distances in the tool, is less than the thickness of the cutting element nearby the fixed end thereof.

26 Claims, 26 Drawing Figures

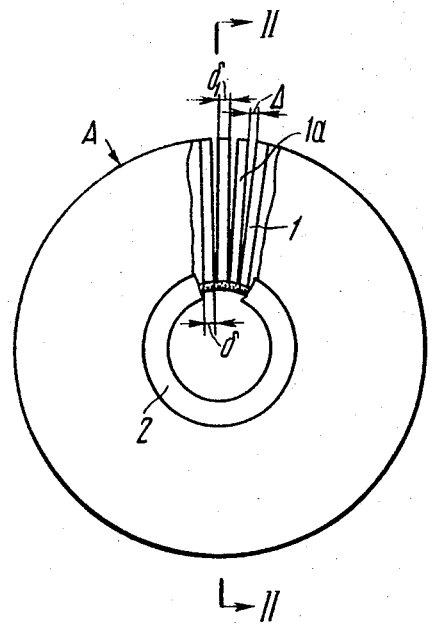
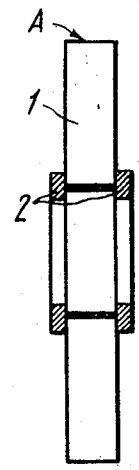
FIG.1  FIG.2
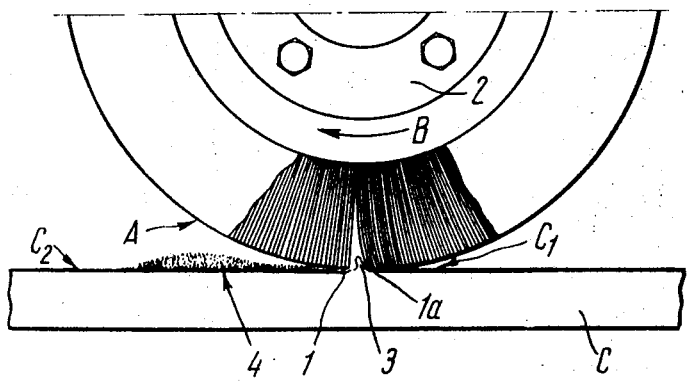
FIG.3

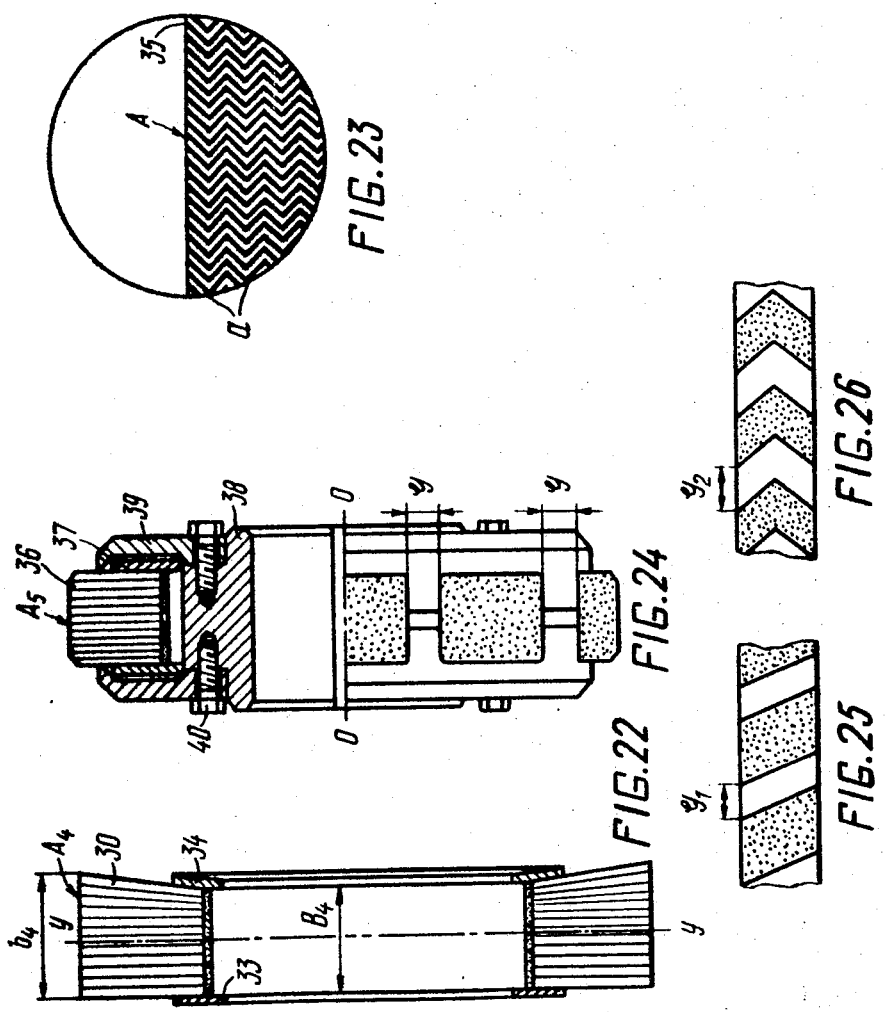

3,811,161

ROTARY CUTTING TOOL

This is a continuation of application Ser. No. 239,507, filed Mar. 30, 1972, now abandoned.

The present invention relates generally to cutting tools and more specifically, to rotary cutting tools suitable for machining the surface of various workpieces or materials.

The invention can find widespread application in descaling hot-rolled metal, peeling or chipping rolled or cast metal from surface defects and casting skin, as well as in cleansing metal surface from rust and other soilings.

It is widely known to use heretofore rotary cutting tools for machining the surface of workpieces or materials, such as abrasive wheels and belts but these are very short-lived which hampers automation of machining processes with the use of said tools.

Besides, in the course of machining such tools are liable to contaminate the surrounding space by abrasive dust which is harmful to the health of the attending personnel, and to soil the cutting chips removed, thus rendering them difficult to reuse.

When machining tough materials such tools are liable to get glazed and cause burns on the surface being machined.

It is likewise known to employ currently such rotary cutting tools for machining the surface of workpieces or materials that are essentially a group of radially arranged elastic cutting elements interconnected with one of their ends, while with the opposite, free ends thereof they adjoin the tool common cutting surface shaped as a surface of revolution.

In said known tools the free ends of the cutting elements located on the tool common cutting surface, are spaced apart from one another at a distance a few times the thickness of the cutting element itself, with the result that, in the course of machining, each of the cutting elements is influenced by the cutting force which is compensated for by the rigidity of the cutting element alone.

It is common knowledge that the amount of metal stock cut off from the surface being machined depends upon the cutting force applied, being in a direct proportionality thereto.

It is therefore quite evident that the cutting efficiency of said known tools is, for the above reason, very low.

Inasmuch as the rigidity of the cutting elements in the known tools is rather low, the magnitude of the cutting force they are able to take up is very small, accordingly. To render the cutting elements of the known tools more rigid, some measures have been taken such as the provision of spacers in between the adjacent cutting elements and of stiffeners on each cutting element. However, all these measures fail to yield any substantially positive results. In the course of the cutting elements are liable to bend to such an extent that they work with their flank, i.e., with the lateral surface thereof which renders it impracticable to effect cutting process with the use of known tools.

Thus, the known cutting tools, even when operating under normal conditions (without being overloaded), feature but very low cutting efficiency and, therefore, are capable of removing but a negligibly small amount of material from the surface being machined for a single pass; if, otherwise, a reasonably high force is applied to such tools (in excess of 1 kgf per millimetre of the width of cutting edge), they are liable to rapidly fail due to broken cutting elements or to the fatigue failure thereof.

One more prior-art rotary cutting tool also known to be use heretofore for machining the surface of workpieces or materials, is made substantially as at least one group of radially arranged elastic cutting elements made fast to one another with one of their ends and forced against one another with their flanks in a close proximity to their interconnected ends, whereas with the opposite, free ends thereof said cutting elements adjoin the tool common cutting surface which is shaped as a surface of revolution.

In said known tool, each of the cutting elements thereof is made as a length of wire and the ratio of the sum of the face areas of the free ends of wire lengths to the entire area of the tool cutting surface is taken to be within 0.10 and 0.93.

Such a construction of the known tool has made it possible to solve the problem of rendering the widely used metal-wire brushes into a cutting tool.

However, practice has shown that, due to randomwise arrangement of the free ends of the adjacent wire lengths with respect to one another on the tool common cutting surface, said tool possesses but substantially limited technological abilities. Such a tool is reasonable to effect either roughing operations or fine turning but at extremely low cutting speeds and feeds and low efficiency. Placed among the disadvantageous features of said tool should be also the fact that it does not enable reversal.

It is an object of the present invention to provide a rotary cutting tool for machining the surface of workpieces or materials which possesses such cutting elements and features such an arrangement of the free ends of the adjacent cutting elements thereof that would be conducive to the formation of a highly durable tool common cutting surface and ensure high cutting ability under more productive cutting conditions as compared to the hiterto known cutting tools of such a type.

Said and other objects are attained due to the provision of the herein-disclosed rotary cutting tool, wherein, according to the invention the free ends of the cutting elements on the tool common cutting surface, when in free state, are spaced a distance apart from one another in such a way that, within the zone where the adjacent free ends of said cutting elements engage each other due to one of them being deflected at the moment of cutting, the value of said distance, taken as the average one for all such distances in the tool, is less than the thickness of the cutting element nearby its fixed end.

To restrict the amount of deflection of the free ends of the adjacent cutting elements at the moment of cutting, spacers are interposed between said cutting elements.

Each of said spacers may be made as a projecting stop provided on the side surface of the cutting element free end.

It is not less favourable when each of said spacers is made as a separator.

The spacers adapted to restrict the amount of deflection of the free ends of the adjacent cutting elements at the instance of cutting may be made of a plastic material so as to at least partly fill the gaps in between the cutting elements along the length thereof.

To increase the length of the cutting elements, with the diameter of the tool common cutting surface remaining unchanged, said elements are corrugated in such a way that their corrugations be arranged in at least one direction parallel to the axis of the tool rotation.

It is expedient that in tools adapted for machining hot metal, e.g., when descaling slabs in continuous casting plants, each of the cutting elements thereof be made of an elastic plate whose free end is reinforced with a high-speed cutting material.

It is no less advantageous when each of the cutting element of the tool is made as an elastic plate whose free end is reinforced with an abrasive material, such a tool is most effective in grinding the surface of such materials that are liable to glaze conventional abrasive wheels.

It is also reasonable, especially in grinding hard metals, to use such a tool, wherein each cutting element is made as two interlinked elastic plates which serve as the coverings of the central plate made of an abrasive material.

Each cutting element of the tool may be fashioned as an elastic plate whose length is calculated by the following formula:

$$l \leq D/[(2\delta_1/\Delta) + 2] \quad (1),$$

$l$ = length of elastic plate,
$D$ = diameter of the tool common cutting surface,
$\delta_1$ = thickness of the elastic plate nearby the tool common cutting surface,
$\Delta$ = distance between the free ends of the adjacent elastic plates within the zone of their contact to each other at the instance of cutting.

A tool having such cutting elements is applicable for machining metals or alloys of a comparatively low hardness, as well as whenever it is undesirable or inadmissible that the chips cut be contaminated with, say, abrasive dust.

The tool may incorporate a gang of several groups of radially arranged elastic cutting elements which with their interlinked ends form a number of cylindrical cavities corresponding to the number of the groups and spaced consecutively along the axis of the tool rotation at a preset distance from one another, while the free ends of the cutting elements are joined together to form a common cutting surface whose width is essentially equal to that of the free end of a cutting element.

In this case any of the above mentioned tool elements can serve as cutting elements.

Due to such a construction, the proposed tool can find most effective use in removing deeply located local defects of material.

To machine broad-strip materials across the entire breadth thereof, it is recommended that use is made of a tool having a cutting surface of any required width. It is the herein-proposed tool that may serve as just such a tool, incorporating a gang of groups of radially arranged elastic cutting elements, wherein their free ends have a width larger than and multiple of the width of the interlinked ends thereof that form a number of cylindrical cavities corresponding to the number of the groups and adjoining one another lengthwise the axis of the tool rotation, the width of the tool common cutting surface being equal to the total length of said cavities or exceeding that by the value equal to the width of the free end of a cutting element.

The tool of such a construction can use any of the aforesaid cutting elements.

Besides, it must not be overlooked that any of the aforementioned cutting elements may be corrugated so that the corrugations be arranged in one direction only, viz., parallel to the axis of the tool rotation.

The above-mentioned object is also successfully attained in the case where each cutting element of the tool is made of an elastic rod whose free end is reinforced with a high-speed cutting material, such a construction of the cutting elements renders the tool common cutting surface flexible, whereby the workpiece being machined is so treated that a layer of the preset thickness is removed from all sections of the rough surface thereof. This is especially necessary in treating cast pieces to strip the casting skin therefrom.

In treatment of pieces produced from extra hard materials, it is favourable to use a tool having the cutting elements made as elastic rods whose free ends are reinforced with an abrasive material.

It is likewise expedient to use a tool, wherein each of the cutting elements is essentially an elastic rod whose length is found from the following formula:

$$L = kD/[(\delta_1/\Delta) + 2] \quad (2),$$

where
$L$ = length of elastic rod,
$D$ = diameter of the tool common surface,
$\delta_1$ = thickness of elastic rod nearby the tool common cutting surface within the zone of contact of the adjacent free ends of rods at the moment of cutting,
$\Delta$ = distance between the free ends of the adjacent elastic rods within the zone of their contact with each other at the moment of cutting,
$k$ = numerical factor adopted to range within 0.7 to 1.2.

The proposed tool having cutting elements made of elastic rods or elastic rods with free ends reinforced with a high-speed cutting material or an abrasive material, may have the following constructional features: it incorporates a gang of at least one pair of groups of radially arranged elastic cutting elements equal in length and with their interlinked ends forming a common globoidal cavity, whereas the free ends of said cutting elements in each group of the gang are inclined to the plane of symmetry of the latter that is perpendicular to the axis of the tool rotation, to make an angle of $\alpha_x$ therewith, the magnitude of which is determined from the formula:

$$\alpha_x = 2 \text{ arc sin } [b_x(D\phi - D_1\phi_1)/4D\phi_1L_1] \quad (3),$$

where
$D_1 = D - 2L$,
$b_x$ = distance between the centre lines of the rods of groups arranged symmetrically with respect to the plane of symmetry of the gang,
$D$ = diameter of the tool common cutting surface, $L$ = length of cutting element, $\phi$ = ratio of the sum total of the areas of faces of the free ends of the cutting elements on the tool cutting surface to the total area of the tool cutting surface, $\phi_1$ = ratio of the sum total of the areas of faces of the interlinked ends of the cutting elements to the total area of the side surface of the cavity formed by said interlinked ends.

Such a tool is most efficiently applicable in machining cast workpieces of intricate shape to remove casting skin, lost head, cinder patches from deep cavities, depressions and grooves of a casting.

To machine broad and thin bands when necessity arises in removing thin oxide films from the surface thereof, it is most expedient to use a tool incorporating a gang of the groups of radially arranged elastic cutting elements made as elastic rods or elastic rods with the reinforced free ends thereof, which elements form with their interlinked ends a common cylindrical cavity, the diameter of the tool common cutting surface being found from the formula:

$$D = L \frac{2}{1 - \frac{\varphi}{\varphi_i}} \quad (4)$$

where $D$ = diameter of the tool common cutting surface,
$L$ = length of cutting element,
$\phi$ = ratio of the sum total of the areas of faces of the free ends of the cutting elements on the tool cutting surface to the total area of the tool cutting surface,
$\phi$ = ratio of the sum total of the areas of faces of the inter-linked ends of the cutting elements to the total area of the side surface of the cavity formed by said interlinked ends.

When cleaning workpieces or materials over 600 mm wide, it is best to use a composite tool forming its width, i.e., composed of a number of narrow gangs; in this case the length of a common cylindrical cavity of the gang is equal to 0.80–0.97 the width of the common cutting surface thereof.

Cutting elements incorporating elastic rods, may be so corrugated so that their corrugations are arranged not only in a direction parallel to the axis of the tool rotation but also in the direction square therewith.

To provide better chip disposal conditions and better cooling of the surface under machining, the herein-proposed tool can be provided on the common cutting surface thereof with slots passing from one of its end faces to the other.

The rotary cutting tool disclosed in the present invention, due to the afore-discussed advantageous constructional features of its cutting elements and due to their arrangement in a group and a gang, has a long-lived and durable cutting surface of practically any width and possesses high cutting efficiency under rather high machining conditions.

The present invention is exemplified in the description of specific embodiments thereof to be read in conjunction with the accompanying drawings, wherein:

FIG. 1 is a side-elevation, partly broken away schematic view of a rotary cutting tool, according to the invention;

FIG. 2 is a section taken along the line II–II on FIG. 1;

FIG. 3 is an enlarged, diagrammatic view showing the mutual arrangement of a tool, according to the invention, and a workpiece being machined, (the tool being shown in part);

FIG. 22 is a longitudinal-section view of a narrow gang, according to the invention;

Figure 4:
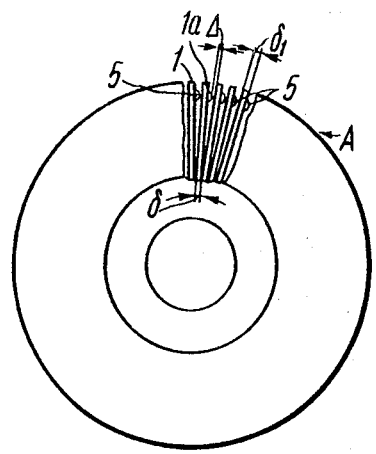
FIG. 4 is a side-elevation view of a tool showing a stop, according to the invention located on the side surface of the free end of one of the adjacent cutting elements thereof.

FIG. 23 presents a portion of the tool, according to the invention showing corrugated elastic rods;

FIG. 24 is a front elevational view, partly in longitudinal section, of a tool having transverse slots on its common cutting surface, according to the invention; and FIGS. 25 and 26 are plan views of the tool cutting surface showing the arrangement of slots on a portion of the tool common cutting surface, according to the invention.

Reference being now directed to the accompanying Figures, the herein-proposed rotary cutting tool for machining the surface of workpieces or materials, is disclosed with reference to a specific embodiment thereof, which comprises essentially a group of radially arranged elastic cutting elements 1 (FIG. 1) interlinked with one of their ends, in a close proximity to which said cutting elements are forced against one another with their flanks, while with their opposite free ends said cutting elements adjoin a tool common cutting surface A shaped as a surface of revolution. According to the invention, the free ends of the cutting elements on the tool common cutting surface, when in free state, are spaced some distance apart from one another so that within the zone where the adjacent free ends of said cutting elements contact each other, due to one of them being deflected at the moment of cutting, said distance, viz., a gap $\Delta$ has the value which, when taken as the average value for all such distance in the tool, is less than a thickness $\delta$ of a cutting element nearby the fixed end thereof.

The adjacent cutting elements may be joined together with one of their ends by resorting to any of the conventional techniques suitable for the purpose. In the herein-considered exemplary embodiments of the present invention, said ends are interlinked through welding.

At its end faces the tool has flanges 2 (FIGS. 1 and 2) which are connected to the interlinked ends of the elastic cutting elements 1 and are adapted for clamping the tool on the spindle of a machine.

In the herein-discussed embodiment of the invention, the gap $\Delta$ is formed by the adjacent cutting elements on the tool common cutting surface A.

Each cutting element, while contacting the surface being machined, is urged by the cutting force to deflect in the direction opposite to the direction of the tool rotation. As a result, the deflected cutting element comes in touch with the adjacent cutting element, thus causing it to deflect in the same direction till touching the next adjacent cutting element which, in turn, while being deflected, gets in contact with the adjacent cutting element to deflect it accordingly, and so forth. Since each cutting element, while being deflected, develops a reactive force of recoil or kick-back, thus, as the ever-increasing number of the elastic cutting elements get progressively involved in the zone of elastic deflection, the total recoiling force of the thus-increasing number of the deflected elastic cutting elements rises accordingly. As soon as the total recoiling force exceeds by its magnitude i.e., that of the force necessary for the cutting element (at the given moment in contact with the surface being machined) to cut off chips, the cut will occur. Thereupon, the entire cutting cycle is repeated with respect to the next cutting element.

The essence of the cutting process involved is illustrated in FIG. 3, wherein a fragmentary diagrammatic view of the proposed tool is represented.

The tool, while rotating round its own axis in the direction of the arrow B and at the same time traversing leftwards with respect to the workpiece C, with its cutting element 1a that has been deflected rightwards (as a result of the free ends of the adjacent cutting elements getting deflected), cuts off a metal chip 3 from the surface of said workpiece C under machining. Further, once the chip removing process is completed, the cutting element 1a is urged by elastic forces to straighten out, thus kicking up the cut chip 3 onto a zone 4 of the surface $C_2$ being machined.

Simultaneously with the aforesaid cutting process, another process occurs which is so much important, viz., a continuous self-sharpening of the tool.

Each cutting element, while moving towards the zone of cutting, with its end face slides over the surface $C_1$ of the machined and, consequently, hardened portion of the workpiece C, with the result that the end-face portion of the cutting element gets somewhat attrited and its cutting edge, that communicates the end face with the side surface (flank) of cutting element, is sharpened.

Thus, a permanent spontaneous process of the tool self-sharpening occurs, as a result of which the tool made according to the invention, works 1,000 or more hours without being resharpened.

The herein-discussed tool may have spacers interposed between the adjacent cutting elements thereof to restrict the amount of deflection of the free ends of said cutting elements at the moment of cutting.

Such a constructional feature of the tool substantially reduces the value of stresses arising during the cutting process at the critical section of the cutting elements and thereby prolongs the service life of the tool itself.

In order to obtain the limited deflection or spacing mechanical spacing means may comprise projecting stops 5 (FIG. 4) provided on the side surfaces of the free ends of the cutting elements. In this case, the gap $\Delta$ is established in between the stop 5 of the cutting element 1 and the free end of the adjacent cutting element 1a, i.e., within the zone where the free ends of the adjacent cutting elements 1 and 1a come in contact as a result of one of them getting deflected at the moment of cutting. The gap $\Delta$ is less than the thickness $\delta$ of a cutting element nearby the fixed end thereof.

Said stops 5 may be provided by extruding some portions of the flanks of the cutting elements or by welding or cementing short pins to said flanks.

Figure 5:
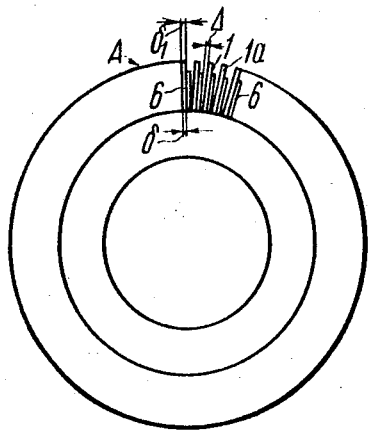
FIG. 5 is a side-elevation view of a tool showing a spacer, according to the invention made fast on the side surface of the free end of one of the adjacent cutting elements thereof.

It is not less favourable when each of the spacers comprises a separator, FIG. 5 diagrammatically shows the tool, wherein separators 6 are interposed between the adjacent cutting elements 1 and 1a.

The gap $\Delta$ is established in between the separator 6 secured on the flank of the cutting element 1, and the free end of the cutting element 1a adjacent thereto.

Tools having such separators 6 fitted in between their cutting elements, are expedient to be used in machining such materials as plastics, wood or it is undesirable that the chips cut disintegrated, as well as in machining soft metals of the type of aluminium or its alloys.

In the course of tool operation, the separators serve to establish some time delay in the contact of the two adjacent cutting elements with the surface being machined. During such a time interval, coolant is fed to the surface being machined to cool it down and thus prevent the formation of burns thereon.

Figure 6:
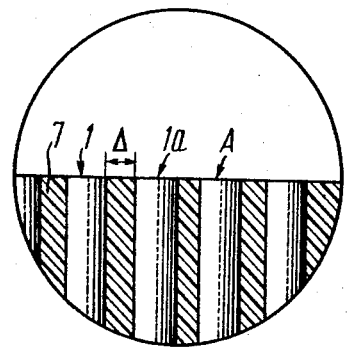
FIG. 6 shows the cutting elements, in which intervening gaps are filled with a plastic material, according to the invention (part of the tool being viewed on an enlarged scale)

Experiments have shown that in machining certain materials such as high-alloy titanium-doped steels, it is most reasonable, with the purpose of imparting a commercially acceptable appearance to the machined surfaces, to use such tools, wherein a plastic material is employed as spacers, said plastic material is adapted to at least partly fill the gaps Δ between the adjacent cutting elements along the length thereof and serves also as means to limit the amount of deflection of the free ends of said elements at the moment of cutting. As FIG. 6 illustrates, a polyethylene plastic material 7 fully fills the gaps Δ in between the cutting elements 1 and 1a.

Numerous investigations have established that, in order to provide long tool service life, it is necessary that the free ends of the cutting elements be as long as possible. However, the longer the free ends of the cutting elements, the larger the gaps in between the adjacent cutting elements of the tool which results in an increased amount of deflection of the cutting elements in the course of cutting; this, in turn, very adversely affects tool service life. One possible solution is an increased diameter of the tool common cutting surface. However, this solution for attaining a longer tool service life is not practicable in all cases. Thus, for instance, a tool with a diameter over 800 mm is practically inapplicable due to its being too bulky, whereas to attain its proper service life the tool would have a diameter of 1,600 to 2,400 mm.

To solve this problem, i.e., to increase the length of the cutting elements without changing the diameter of the tool common cutting surface, the elements are to be corrugated in such a manner that their corrugations are arranged in at least one direction which is parallel to the tool rotation axis.

This subject will hereinafter be considered in detail.

Further, let us consider some specific embodiments of elastic cutting elements.

Figure 7:
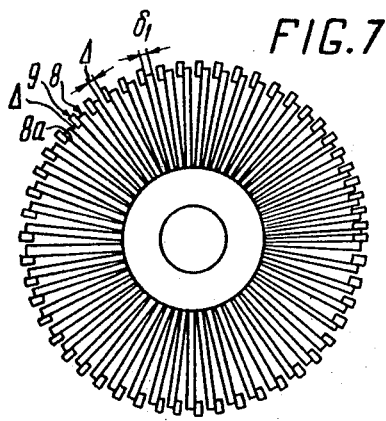
FIG. 7 is a side-elevation view of a tool, wherein its cutting elements are made as elastic plates whose free ends are reinforced with high-speed cutting material, according to the invention.

A cutting element can be made of an elastic plate 8 (FIG. 7) whose free end is reinforced with a high-speed cutting material fashioned as a tip 9 which defines said gap Δ with the free end of an adjacent plate 8a.

Such a construction of the cutting element is satisfactory for use in machining hot metal, e.g., when treating slabs in the course of rolling or for stripping casting skin from cast items. In the former case, high-speed cutting material used, due to its thermal resistant properties, affords longer tool service life, while in the latter case it permits the casting skin to be cut off without danger of chipping of tool cutting edge under the effect of hard inclusions encountered on the surface of the workpiece being machined.

Figure 8:
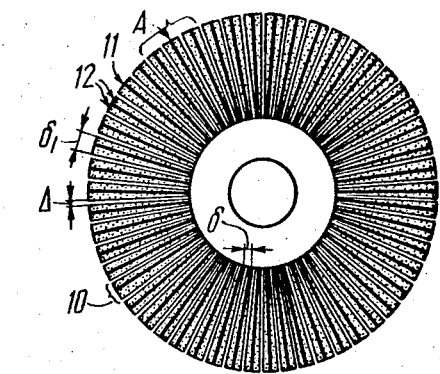
FIG. 8 is a side-elevation view of a tool, wherein the free ends of the elastic plates are reinforced with an abrasive material, according to the invention.

It is expedient, in machining steel bands or ribbons, that the cutting element 10 (FIG. 8) be made as an elastic plate 11 reinforced with an abrasive material 12. In this case, the gap Δ is formed by two adjacent surfaces of the abrasive material, while the value $\delta_1$ is characteristic of the cutting element thickness nearby its fixed end and the value $\delta_1$, of the cutting element thickness on the tool common cutting surface.

Such a tool is effective when used in grinding workpieces of materials that tend to glaze conventional abrasive tools, this being due to the fact that when grinding with the use of the tool proposed herein, each of its cutting elements, upon having cut off chips from the surface being machined, while getting straightened out, kicks forward the thus-cut metal chip.

Besides, by virtue of high felxibility of both the cutting elements and the tool as a whole, the tool is suitable for fine grinding operations, especially in machining large-area surfaces, thus adding much to the quality of surface finish obtained.

Figure 9:
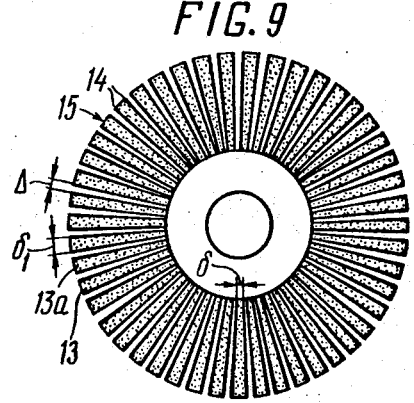
FIG. 9 is a side-elevation view of a tool having the cutting elements made as two interlinked elastic plates which serve as the coverings of a central plate, according to the invention.

A cutting element 13 (FIG. 9) may be made of two elastic plates 14 fixed together and serving as the coverings of a central plate 15 of an abrasive material.

In this case the gap Δ is formed by the side surfaces (flanks) of the adjacent cutting elements 13 and 13a and the value δ characterizes the overall thickness of the interlinked elastic plates 14 in a close proximity to their fixed ends.

Such a constructional feature of the cutting element 13 is expedient for a tool used in machining relatively hard materials including heat treated carbon steels.

Figure 10:
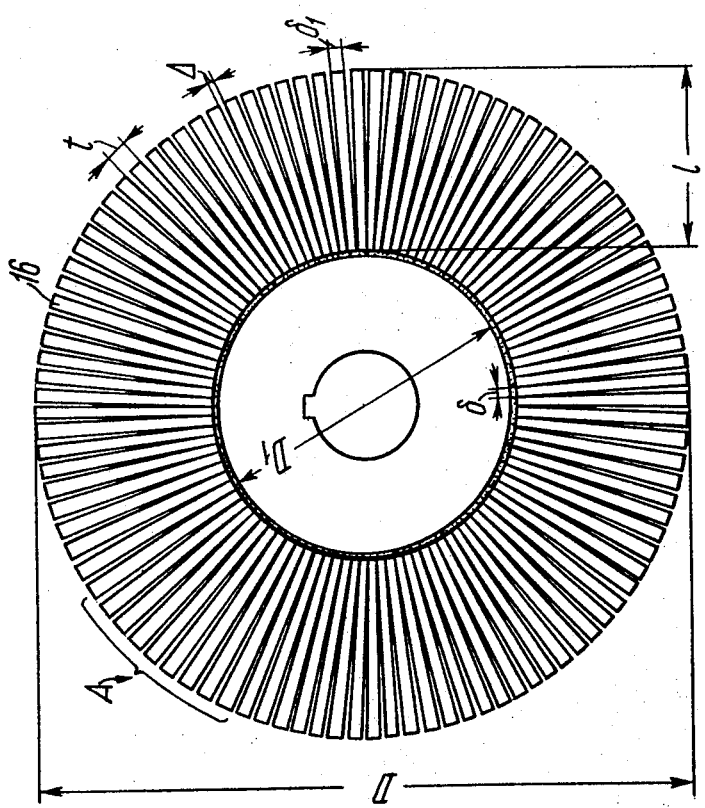
FIG. 10 is a side-elevation view of a tool having its cutting elements made as elastic plates, according to the invention (as viewed with the front cover plate removed)

The tool cutting element may be made as an elastic plate 16 (FIG. 10). In this case, to provide the desired gap Δ in between the free ends of the adjacent elastic plates of the tool, the length $l$ of the elastic plate is calculated from the following relation:

$$l \leq D/[(2\delta_1/\Delta) + 2],$$

where $D =$ diameter of tool common cutting surface A,
$\delta_1 =$ thickness of the free end of a plate nearby tool common cutting surface,
$\Delta =$ gap in between the free ends of adjacent elastic plates within the zone of their mutual contact at the moment of cutting.

Said gap (which is essentially the distance between the free ends of the adjacent cutting elements within the zone where they get in contact with each other at the moment of cutting) has the value defined as the average one for all such gaps in the tool.

We have established that long tool service life is ensured if the gap Δ in between the adjacent plates within the zone of their mutual contact at the moment of cutting is at least five times as low as the thickness δ of the plate 16 in a close proximity to the point of its fixing. It is also found that the lower the value of said ratio the larger the permissible magnitude of the cutting force that can be applied to the tool common cutting surface A.

When designing such a tool, the values of the ratio Δ/δ are predetermined for a definite magnitude of the cutting force. The value D, viz., the diameter of the tool common cutting surface A, is to be selected for constructional reasons.

In order to actually obtain the preset value of the ratio Δ/δ in a tool, wherein the thickness of the plate is the same throughout the length of the latter, i.e., $\delta=\delta_1$, with the known value of the diameter of the tool common cutting surface, the value 1 shall be determined from the following equation:

$$l = D/[(2\delta_1/\Delta) + 2]$$

In cases where the value $l$ is found from the relation $$l < D/[(2\delta_1/\Delta) + 2]$$

the actually obtained amount of the gap Δ will be smaller than the preset one, the value of the ratio Δ/δ will likewise be smaller than the preset one and the tool will have some margin of the cutting force, correspondingly.

For the sake of clarity, let us consider the following example.

With the thickness of the plate 16 $\delta = 1$ mm (remaining the same along the entire length thereof), the gap $\Delta$ in between the adjacent plates equal to 0.1 mm and the diameter D of the tool common cutting surface A equal to 500 mm, the numerical value of $l$ will be:

$$l = D/[(2\delta/\Delta) + 2] = 500/[(2.1/0.1) + 2] = 22.7 \text{ mm}$$

Taking into account that the interlinked ends of plates form with their faces a cylindrical cavity, the diameter D of said cavity is equal to $$D_1 = D - 2l = 500 - 2 \cdot 22.7 = 454.6 \text{ mm}$$

The surface of said cylindrical cavity can accommodate but the following amount of the plate end faces denoting as $n$:

$$n = \pi D_1/\delta ,$$

where
$\delta$ = thickness of plate at its fixed end.

Such a number of plates will be spaced over the tool common cutting surface A at the pitch $t$:

$$t = \pi D/n = \pi D\delta_1/\pi D_1 = 500 \cdot 1.0/454.6 \approx 1.1 \text{ mm}$$

Inasmuch as the value of the pitch t is made up by the sum of the thickness $\delta_1$ of the plate 16 and the amount of the gap $\Delta$ in between the adjacent plates, thus at the plate thickness $\delta_1 = 1$ mm the amount of the gap therebetween on the tool cutting surface shall be equal to $$\Delta = t - \delta_1 = 1.1 - 1.0 = 0.1 \text{ mm},$$

where
$\delta_1$ = thickness of plate on tool cutting surface.

In those cases where the value $l$ is adopted to be smaller than that found from the equation, e.g., $l = 15$ mm, so the diameter of the cylindrical cavity will be equal to $D_1' = 500 - 2 \cdot 15 = 470$ mm.

There will be accommodated $n_1$ of the plate end faces on the surface of the cylindrical cavity with the diameter $D_1'$, the value of $n_1$ being found from the following formula:

$$n_1 = \pi D_1'/\delta > n$$

The quantity $n_1$ of the plate end faces will be spaced over the tool common cutting surface A at another pitch $t_1$:

$$t_1 = \pi D/n_1 = \pi D\delta/\pi D_1' = 500/470 = 1.065 \text{ mm},$$

whence $\Delta_1 = t_1 - \delta_1 = 1.065 - 1.000 = 0.065$ mm, i.e., the obtained amount of the gap $\Delta_1$ is less than the estimated gap $\Delta$:

$$\Delta_1 < \Delta.$$

The tool incorporating such cutting elements is ultimately simple by its construction, inexpensive and may be applied for machining reasonably soft materials such as plastic items, with the width of the surface being machined not over 100 mm if no special requirements are to be met by the machined surface.

Figure 11:
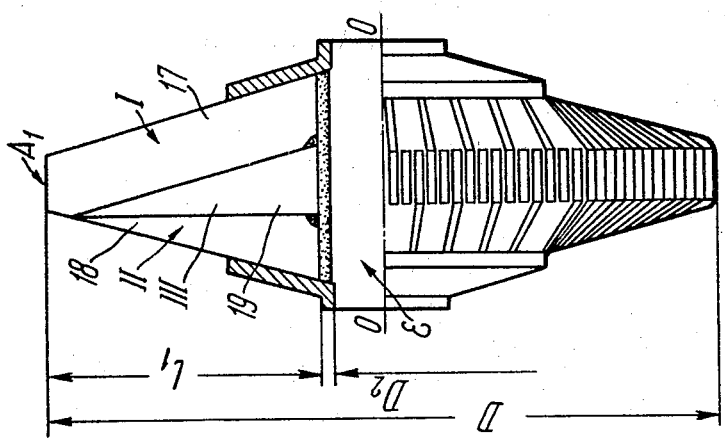
FIG. 11 is a diagrammatic face view, substantially in longitudinal cross-section, of a rotary cutting tool, incorporating a gang of a number of groups of radially arranged elastic cutting elements, according to the invention.

To eliminate deeply located local defects in the workpieces being machined, it is expedient to use the type tool represented in FIG. 11 which comprises a gang of three groups I, II and III of radially arranged elastic cutting elements 17, 18 and 19 which form with their interlinked ends a number of cylindrical cavities corresponding to the number of the groups, said cavities being located in succession along the tool rotation axis 0—0 at a preset distance from one another to make up a common cylindrical cavity E. Besides, the free ends of the cutting elements are brought into a common cutting surface $A_1$ whose width is essentially equal to the width of the free end of a cutting element.

Now let us consider the case where it is necessary to provide a tool of the above-disclosed construction featuring the following parameters:

$D = 200$ mm; $\delta_1 - \delta = 1$ mm; $\Delta/\epsilon_1 = 1/5$; $D_2 \approx 50$ mm, whereas the width of the tool common cutting surface A is essentially equal to the width of the free end of a cutting element.

Further, let us find the pitch t at which the end faces of the cutting elements are spaced over the tool common cutting surface $A_1$:

$$t = 1 + 1/5 = 1.2 \text{ mm}$$

At such a value of the pitch $t$ the tool common cutting surface $A_1$ whose width is essentially equal to the width of the free end of a cutting element, will accommodate $n_2$ of the cutting elements:

$$n_2 = \pi D/t = \pi \cdot 200/1.2 = 523 \text{ mm}$$

It is quite evident that the fixed ends of such a number of the cutting elements cannot be spaced along the diameter $D_2$ in a single group in a similar way to the arrangement of their free ends on the common cutting surface $A_1$ with the diameter D. Thence, having rounded off the obtained number of the cutting elements to 525, let us subdivide this number into three groups I, II and III (each containing 175 elements) comprising the corresponding cutting elements 17, 18 and 19 which form with their interlinked ends a number of cylindrical cavities located in succession lengthwise the tool rotation axis 0—0 to make up a common cavity E.

Assuming that each group contains 175 radially arranged cutting elements and the side surfaces of their interlinked ends contact one another, the pitch at which they are spaced over the surface of the cavity is equal to the thickness $\delta$ of a cutting element. Thus, the true diameter of the cavity in each group (or the diameter $D_2$ of the common cavity E) can be determined as follows:

$$D_2 = [(n_2/3) \cdot \delta]/\pi,$$

where
$n_2/3$ = number of cutting elements per group,
$\delta$ = thickness of cutting element,
whence $D_2 = 175 \cdot 1/3 \cdot 14 \approx 55$ mm.

Minimum length $L_1$ of a cutting element is determined from the following relation:

$$l_1 = (D - D_2)/2 = (200 - 55)/2 \approx 72.5 \text{ mm}$$

In the now-discussed example the cutting element, 19 of the group III has a minimum length.

As it is evident from the above example, with the equality $\Delta/\delta = 1/5$ the relation $l_1/D$ is in excess of one-third which enables small-diameter tools with high length of its cutting elements to be provided.

Such tools are applicable for cutting off adequately large amounts of metal stock, especially in eliminating local defects.

To eliminate defects in soft metals such as copper or aluminium, in the capacity of cutting elements use can be made of elastic plates, whereas in machining harder materials, it is expedient to use cutting elements made as elastic plates reinforced with the tips of a high-speed cutting material. Tools of the same construction but with cutting elements reinforced with an abrasive material can successfully be used in machining workpieces made of high-hardness materials. In this case machining is carried out as a grinding operation using elevated peripheral speeds (about 60 m/s).

The proposed tool may incorporate a gang of the groups of radially arranged elastic cutting elements 20 and 21 (FIG. 12) whose free ends have the widths $b_1$ and $b_2$ which is larger than, and a multiple of the respective widths $B_1$ and $B_2$ of their interlinked ends. The latter form a number of cylindrical cavities corresponding to the number of groups per gang (three in the herein-considered example), said cavities adjoining one another lengthwise the axis OO of the tool rotation.

Besides, the width F of the common tool cutting surface $A_2$ will be equal to the overall length of said cavities or be in excess of that by the value of the width of the free end of a cutting element.

Such a tool can find utility when used in machining broad-strip materials across the entire breadth thereof, since the tool may have the common cutting surface $A_2$ of any preset width.

The main constructional feature of such a tool resides in that it can be manufactured from plates of a reasonably high length at a small diameter of the common cutting surface thereof and a low enough value of the ratio $\Delta/\delta_1$ which renders said tool highly durable.

Let us take as an example the case where it is necessary to provide a tool with the width F of its common cutting surface equal to 200 mm, the diameter D of the common cutting surface equal to 240 mm, the length $l$ of the cutting elements equal to 70 mm and the numerical value of the ratio $\Delta/\delta_1$ equal to one fifth (at $\delta_1 = \delta = 1$ mm).

The pitch $t$ at which the cutting elements are spaced over the tool common cutting surface will thus be as follows:

$$t = \delta_1 + \Delta = \delta_1 + (\delta_1/5) = 1 + (1/5) = 1.2 \text{ mm}$$

The quantity $n$ of cutting elements per group which will be spaced over the tool common cutting surface of the diameter D = 240 mm, is as follows:

$$n = \pi D/t$$

However, only $n_1$ of cutting elements can be accommodated on the tool cylindrical cavity formed by one group of the interlinked ends, provided that the latter adjoin one another with their side surfaces, where $n_1 = \pi(D - 2l)/\delta$ Having performed the following division:

$$n/n_1 = \pi D/1.2 : \pi(D-2l)/1$$

and having substituted the corresponding numerical values, we will find that $n/n_1 = 2$.

Thence, to obtain the preset parameters of the tool considered in the present example, it is necessary that each group of cutting elements on the tool common cutting surface contains twice as large the number of the free ends as compared to that of the interlinked ends, which can be accommodated on the surface of the cylindrical cavity of said group. Such an effect is attained due to the fact that the width $b_2$ of the free end of a cutting element 20 is larger than and multiple of the width $B_1$ of the fixed end thereof, while the width $b_2$ of the free end of each cutting element 21 is larger than and multiple of the width $B_2$ of its fixed end.

In the above-stated example, the multiplicity factor is equal to 2, i.e., $b_1/B_1 = b_2/B_2 = 2$.

Taking into consideration that the width F of the tool common cutting surface $A_2$ and the overall length of all the cavities formed by all the groups of the tool cutting elements shall be equal (as this is the most reasonable tool construction), and assuming $b_2 = \frac{1}{2} b_1$, we find the numerical value of $b_1$ and $b_2$:

$$b_1 = 2b_2 = F = 200 \text{ mm}, b_2 = 100 \text{ mm},$$

since $b_1 = 2B_1$, thence $B_1 = 100$ mm, whereas $b_2 = 2B_2 = 100$ mm, whence $B_2 = 50$ mm.

When designing such a tool having reinforced cutting elements, the thickness $\delta_1$ of a cutting element on the tool common cutting surface is a summarized value composed of the thickness of a plate and of a reinforcing element, whereas the thickness $\delta$ of a cutting element at its fixed end is essentially the thickness of an elastic plate alone.

When making a tool of such a construction incorporating cutting elements reinforced with an abrasive material and at the same time having spacers made as projecting stops, the width $\delta_1$ of a cutting element is defined as a summarized thickness of the plate reinforced with an abrasive material and of the projecting stop thereof.

In a tool featuring the thickness $\delta_1$ of a cutting element on the tool common cutting surface not equal to the thickness $\delta$ of said cutting element at the fixed end thereof, i.e., $\delta_1 \ 0 \ \delta$, the calculation of the multiplicity factor should make account of the difference of said thicknesses.

Figure 12:
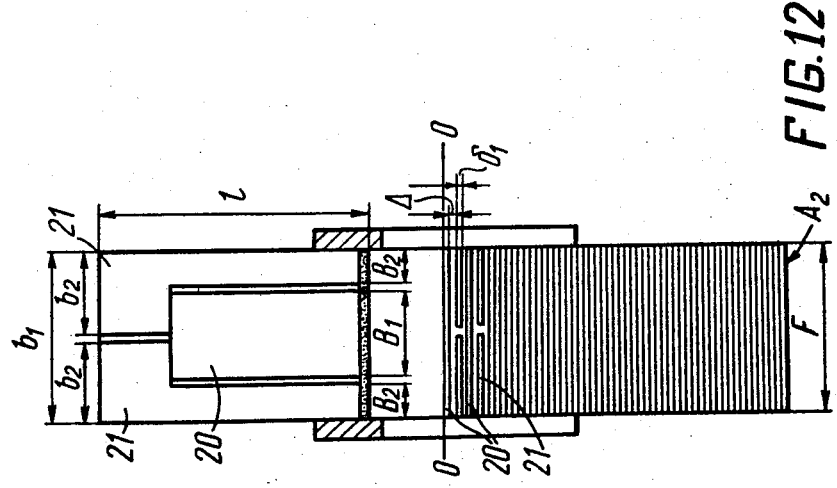
FIG. 12 is a front-elevation, partly sectional view of another embodiment of the proposed tool, according to the invention.

The tool diagrammatically shown in FIG. 12, has its cutting elements made of elastic plates and can be used in rough cleaning of the surface of copper slabs (auerbars) at a continuous casting plant. To machine steel slabs the cutting elements of the tool are expediently produced as elastic plates reinforced with the tips of high-speed cutting material.

When machining steel bands or ribbons, it is also practicable to use the tool of FIG. 12 but having its cutting elements made as elastic plates reinforced with an abrasive material.

In the afore-discussed versions of the tool constructional solution, any of the above-mentioned cutting elements may be used depending upon the kind of work to be performed by the tool. Besides, provision may be made for spacers interposed between the adjacent cutting elements to restrict the amount of deflection of the free ends thereof.

Figure 13:
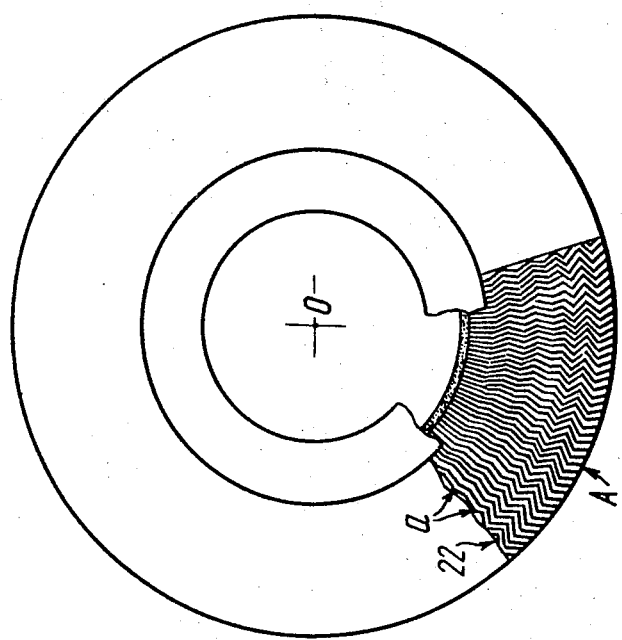
FIG. 13 is a diagrammatic side-elevation view of a rotary cutting tool having corrugated cutting elements, according to the invention.

Furthermore, emphasis should be placed upon the fact that any of the afore-described cutting elements may be made corrugated such as cutting elements 22 in FIG. 13 but in such a manner that their corrugations $\alpha$ are arranged only in one direction which is parallel to the axis OO of the tool rotation.

Figure 14:
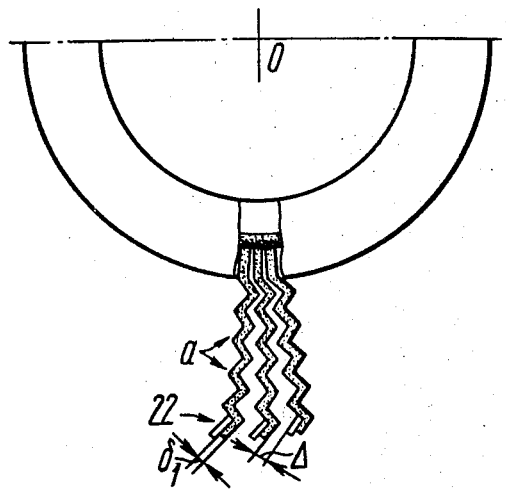
FIGS. 14 and 15 are side-elevation views of the tool portions featuring corrugated cutting elements.

FIG. 14 illustrates the portion of a tool, wherein a cutting element 22 is made as an elastic corrugated plate reinforced with a high-speed cutting material, the corrugations being arranged lengthwise the axis O of the tool rotation, $\delta_1$ denotes the thickness of the free end of an elastic corrugated plate and the value $\Delta$ defines the distance between the free end of an elastic plate and the tip of a high-speed cutting material of the adjacent cutting element 22.

Figure 15:
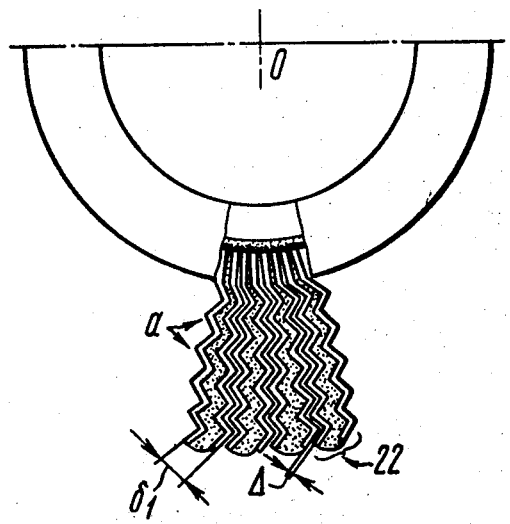

FIG. 15 represents the portion of a tool, wherein each cutting element 22 consists of two corrugated elastic plates made fast together to serve as the coverings of the central plate made of an abrasive material, whereas the corrugations a are arranged along the axis O of the tool rotation, the value $\Delta$ defines the distance between the free ends of the adjacent cutting elements and $\delta_1$ denotes the thickness of a cutting element on the tool common cutting surface.

In cases where the surface under machining is not even and only a preset thin superficial layer of the material is to be removed therefrom, e.g., when removing scale layer that is a few microns thick, from the uneven surface of a thin ribbon, as well as in machining cast items, it is expedient to use a tool with the cutting elements made of elastic rods 23 (FIG. 16) (Sheet 2) whose free ends are reinforced with a high-speed cutting material 24. The other ends of the rods adjoining one another with their side surfaces, are fixed together and held to cover plates 25 adapted to be set on the shaft of a machine where the tool is used.

Under similar conditions, but for machining higher-hardness materials, it is more expedient to use a tool with the cutting elements made as rods 26 (FIG. 17) (Sheet 2) whose free ends are reinforced with an abrasive material 27. In a tool of such a construction, either bort or diamond powder may be used for reinforcing the rods thereof.

Figure 16:
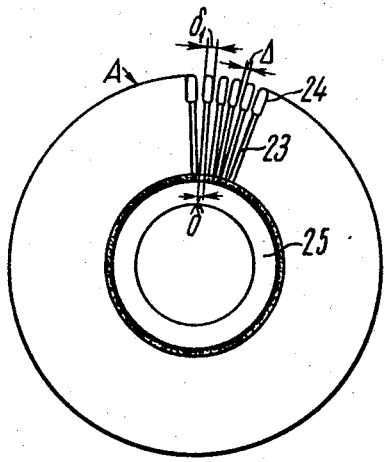
FIG. 16 (sheet 2 of drawing) is a side-elevation view of a tool having the cutting elements made as elastic rods whose free ends are reinforced with a high-speed cutting material, according to the invention.
Figure 17:
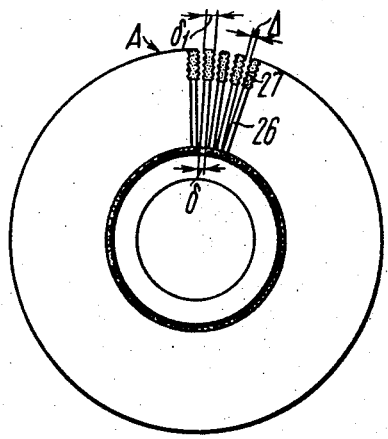
FIG. 17 (sheet 2 of drawing) is a side-elevation view of a tool of FIG. 16, wherein the free ends of elastic rods are reinforced with an abrasive material, according to the invention.

For the tools presented in FIGS. 16 and 17, the thickness $\delta_1$ of a cutting element nearby the cutting surface A is constituted by the thickness of an elastic rod and of its reinforcing layer, whereas the thickness $\delta$ of a cutting element nearby the fixed end thereof is equal to the thickness of the elastic rod within this zone, and the distance $\Delta$ is essentially the amount of deflection of each of the cutting elements until it contacts the adjacent element, the contact occurring in a close proximity to the tool cutting surface A, while the cutting elements contact each other with their reinforced ends.

The tool whose cutting elements are made of elastic rods, is applicable wherever the material being machined features the Vickers hardness number not over 200 and if no special requirements are to be met by the machined surface (as to the quality of surface finish and the depth of hardened layer thereof).

Figure 18:
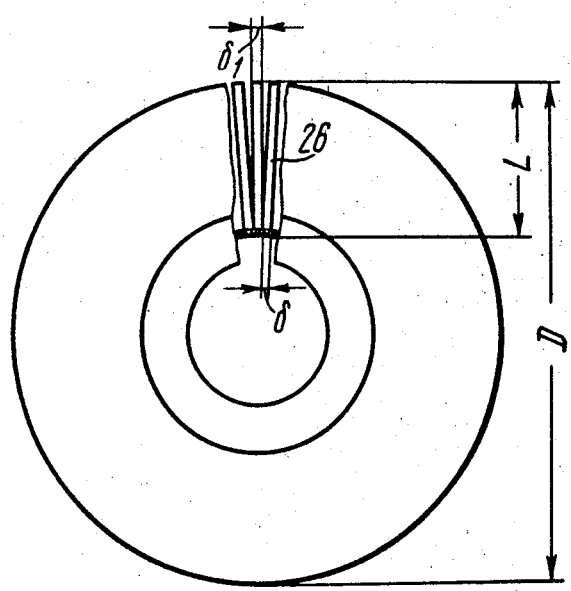
FIG. 18 is a side-elevation view of a tool with the cutting elements made as elastic rods, according to the invention.

The length L (FIG. 18) of an elastic rod is determined from the following relation:

$$L = kD/[(\delta_1/\Delta) + 2],$$

where
L = length of elastic rod,
D = diameter of tool common cutting surface,
$\delta_1$ = thickness of elastic rod nearby tool common cutting surface,
$\Delta$ = distance between the free ends of adjacent elastic rods within the zone of their mutual contact at the moment of cutting,
k = numerical factor adopted to range within 0.7 and 1.2.

Besides, $\delta_1 = d$, where $d$ = diameter of elastic rod.

Let us consider an exemplary finding of the length L of an elastic rod.

The diameter D of the tool common cutting surface is selected for constructional reasons and, as a rule, is adopted to range within 500 and 700 mm.

The ratio of the thickness $\delta_1$ of an elastic rod 26 nearby the tool common cutting surface with the distance $\Delta$ between the free ends of the adjacent elastic rods within the zone of their mutual contact at the moment of cutting, is selected to suit the thickness of metal stock to be removed by the present tool.

We have established that in order to cut off the scale of up to 0.01 mm thick from the surface of annealed low-carbon steel (at an ultimate strength $\delta_{ult} \approx 35$ kg/mm²) said ratio should lie within 6 to 10.

Numerical factor k depends upon the technique of laying the rods into a gang and is adopted to be as follows: in mechanized assembling of rectangular-section rods, 0.9 to 1.2; in mechanized assembling of round-section rods, 0.8 to 0.9; and in manual assembling of round-section rods, 0.7 to 0.8.

Now let us substitute the average magnitudes of the aforestated values in the following equation:

$$L = kD/[(d_1/\Delta) + 2];$$

then let us find the length L of round-section rods; in mechanized assembling of the latter into a gang this length will be equal to $$L = (0.9 \cdot 600)/(8 + 2) = 54 \text{ mm},$$

while in manual assembling of round-section rods said length will be as follows:

$$L = (0.8 \cdot 600)/(8 + 2) = 48 \text{ mm}$$

Figure 19:
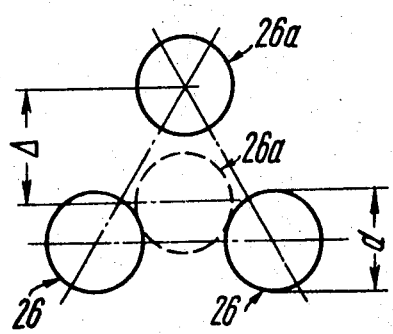
FIG. 19 is an enlarged, diagrammatic plan view of a portion of the tool of FIG. 18.

In FIG. 19 the solid line indicates the position of the elastic rods 26 and 26a, when in free state, while the dotted line shows the position of one of the rods 26a after it has been deflected at the moment of its contact with the rods adjacent thereto.

It is not infrequently that in practice some cases are encountered where casting skin or lost head is to be removed from intricate-shaped workpieces having numerous depressions and recesses.

In this case the most essential criterion for selecting a tool is its ability to penetrate into depressions and cut off rather heavy metal stock (amounting to 2-5 mm) sharply variable lengthwise the surface under machining.

These requirements are mostly met by the tool comprising a gang of at least one pair of the groups of radially arranged elastic cutting elements 28 (FIG. 20) equal in length and adapted to form with their interlinked ends a common globoidal cavity $E_1$ in the gang, whereas their free ends in each group of the gang are inclined to the plane of symmetry X—X of the latter perpendicular to the axis O—O of the tool rotation, to make an angle of $\alpha_x$ therewith, the magnitude of said angle being determined from the following relation:

$$\alpha_x = 2 \arcsin [b_x (D\phi - D_1 \phi_1)]/(4D_1\phi_1 L),$$

where
$D_1 = D - 2L,$
$b_x$ = distance between the centre lines of the rods of groups arranged symmetrically with respect to the plane of symmetry of the gang,
D = diameter of the tool common cutting surface,
L = length of cutting element, $\phi$ = ratio of the sum total of the areas of faces of the free ends of cutting elements on tool cutting surface to the total area of tool cutting surface, $\phi_1$ = ratio of the sum total of the areas of faces of the interlinked ends of cutting elements to the total area of the side surface of the cavity formed by said interlinked ends.

Figure 20:
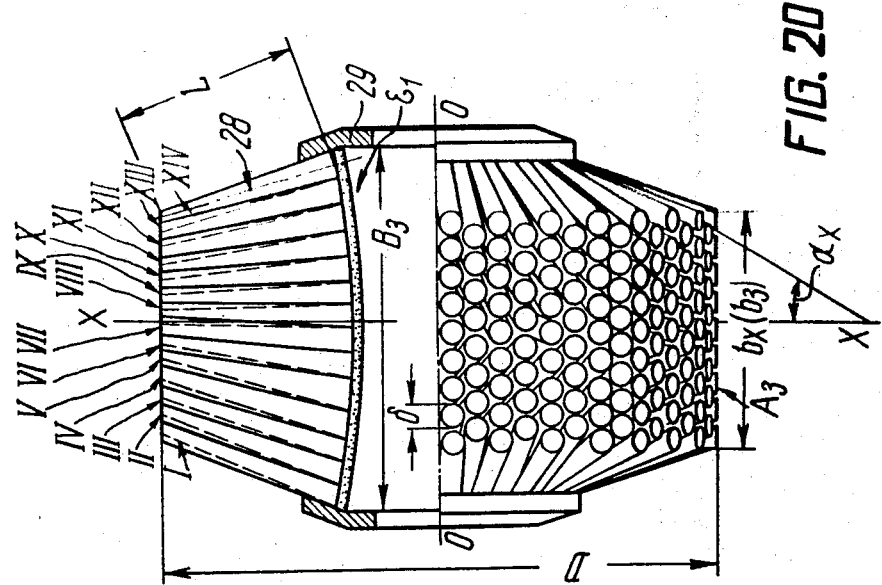
FIG. 20 is a front-elevation view, partly in longitudinal section, of a tool, wherein its gang comprises rods I through XIV pairs of groups of radially arranged elastic cutting elements, according to the invention.

FIG. 20 illustrates only one dimension of $b_x = b_3$, i.e., the distance between the centre lines of the rods of the extreme pair of the groups I and XIV of the cutting elements 28 and the corresponding angle $\alpha_3$ of inclination of said cutting elements.

FIG. 20 represents a tool wherein its gang comprises the groups I through XIV, one of the ends of the cutting elements 28 being weld-joined and held to a cover plate 29. Said tool employs elastic rods as cutting elements; however, it can incorporate also elastic rods reinforced with either high-speed cutting material or an abrasive material, or also can use cutting elements with the gaps between these at least partly filled with a plastic material along the length thereof.

A tool featuring its cutting elements reinforced with a high-speed cutting material is expedient to be used in machining iron castings on whose surface there are encountered the grains of chilled iron or casting skin, whereas a tool having the cutting elements reinforced with an abrasive material is most reasonable to be employed in machining materials featuring their Vickers hardness number not over 200.

Let us consider, as an example, the case where provision is to be made of a tool whose cutting elements are made essentially as round-section elastic rods.

Assume that there is necessary to provide a tool with the diameter D of its common cutting surface equal to 200 mm and the width $b_3$ of the common cutting surface equal to 50 mm.

Such a tool is adapted for machining the surface of medium-carbon steel having an ultimate strength of 45 kgf/mm². Our studies have established that, for machining such a steel the magnitude of the value $\phi$ should range within 0.68 and 0.78. For the purpose of estimation, let us adopt the average magnitude of the $\phi = 0.7$.

To provide a tool having maximum service life, the length L of a cutting element should be as long as possible. However, said length is limited on one hand by the diameter D of the common cutting surface $A_3$ and on the other hand, by the minimum dimension $D_1$ which depends upon the diameter of the shaft of a machine, whereon said tool shall be clamped.

Assume the minimum magnitude of the value $D_1$ to be equal to 80 mm; thence, we find from the equation $$D_1 = D - 2L$$

that $L = (D - D_1)/2 = (200 - 80)/2 = 60$ mm.

The magnitude of the value $\phi_1$ depends upon the gang assembly technique. Investigations in this respect have shown that the maximum possible magnitude of the value $\phi_1$ for round-section rods is 0.906 but said magnitude is practically inattainable. In manual gang assembly technique said magnitude in tools of the above-described construction ranges within 0.82–0.84, while in mechanized assembly it lies within 0.84–0.88.

Taking into account, that the assembly of the rods in the gang is carried out by mechanized technique, assume the magnitude of $\phi_1 = 0.85$.

With the above magnitudes adopted, let us find the magnitude of the angle $\alpha_3$ of the surfaces of cover plates 29 adjoining the cutting elements so as to obtain a tool with the preset parameters:

$$\alpha_3 = 2 \text{ arc sin } [50(200 \cdot 0.1 - 80 \cdot 0.85)/4.80 \cdot 0.85 \cdot 60]$$

$$\alpha_3 = 2 \text{ arc sin } 0.22$$

$$\alpha_3 = 24°$$

It is worth noting, that the tool of such a type suitable for eliminating deeply located defects, machining recesses or grooves, as well as workpieces having on its surface to be machined some elements of a curved profile, should feature its common cutting surface imparted the corresponding profile.

For machining broad (up to 0.5 m) and thin (below 1 mm thick) bands or ribbons, wherein oxide films or scale layers as fine as 5 to 25 microns should be removed from the surface thereof, it is recommended to use a rotary cutting tool comprising a gang of radially arranged elastic cutting elements 30 (FIG. 21) adapted to form with their ends joined together by a welded seam 31, a common cylindrical cavity $E_2$. The diameter D of the tool common cutting surface A is determined from the following relation:

$$D = L \, 2/[1 - (\phi/\phi_1),$$

where

L = length of cutting element, $\phi$ = ratio of the sum total of the areas of faces of the free ends of cutting elements on tool cutting surface to the total area of tool cutting surface, $\phi_1$ = ratio of the sum total of the areas of the interlinked ends of cutting elements to the total area of the side surface of the cavity formed by said interlinked ends.

The gang is confined with cover plates 32.

We have established that, for cutting off a layer of metal stock up to 0.05 mm thick from the surface of carbon steel with an ultimate strength up to 45 kgf/mm², it is expedient to use a tool, wherein the magnitude of the value $\phi$ ranges within 0.68 and 0.78.

Let us consider the case of using the tool for removing hot-rolled mill scale 0.01 mm thick from the surface of carbon steel with an ultimate strength of 38 kgf/mm².

Assume the magnitude of the value $\phi$ equalling 0.7.

The tool has the cutting elements made as round-section rods, the magnitude of the value $\phi_1$ ranging within 0.850–0.906.

When the mechanized assembling of rods into a gang is used, the magnitude of the value $\phi_1$ is assumed to be 0.9.

Having substituted the above-assumed magnitudes, we will find $$L/D = [1 - (\phi/\phi_1)]/2 = [1 - (0.7/0.9)]/2 = 0.11$$

At such a value of the ratio $L/D$ the following numerical combinations of L and D are possible:

| L | 10 | 20 | 30 | 40 | 50 | 60 | 80 | 100 |
|---|----|----|----|----|----|----|----|-----|
| D | 90 | 180 | 270 | 360 | 450 | 550 | 720 | 910 |

Studies have proved that in machining low-carbon steels the length L of cutting elements is reasonable to be adopted not below 50 mm.

From the above table we find that the diameter of the tool common cutting surface may be not less than 450 mm.

When selecting the optimum numerical value of D, one must take into account that the tool of a larger diameter is more durable as compared with the tool of a smaller diameter.

However, with the magnitude of D in excess of 800 mm the tool will be too bulky, thus making the construction of the plant using said tool much heavier. Generally, tools whose diameter is above 800 mm are to be used only in extraordinary cases.

To clean the surface of workpieces or materials broader than 600 mm, it is favourable to use a tool made composite across the width thereof, i.e., one composed of a few narrow gangs as it can be seen from FIG. 22. Such a gang confined with cover plates 33 and 34, has a cutting surface $A_4$ whose width $b_4$ exceeds the width $B_4$ (i.e., the length of a cavity formed by the interlinked ends of the cutting elements 30). It is most expedient that the width $B_4$ be equal to 0.80–0.97 the width $b_4$.

In the herein-discussed example this is attained in the following way.

In one of the cover plates 34 (or in both cover plates) the surface that adjoins the cutting elements 30, is made tapered with an angle of taper large enough to ensure the above-stated condition, viz., the width $B_4$ should make up 0.80–0.97 the width $b_4$, i.e., the width $b_4$ should be 3 to 20 percent larger than the width $B_4$.

Then the thus-obtained narrow gangs are fitted onto a common shaft and drawn together until the cover plates of the adjacent gangs come in contact, thus forming the common tool cutting surface.

Thus, a tool can be provided comprising a few gangs and having the common cutting surface of practically any preset width.

To increase the estimated length of cutting elements including elastic rods, the latter are corrugated in one direction or in two mutually perpendicular directions, viz., lengthwise the axis O—O of the tool rotation and perpendicular thereto. FIG. 23 illustrates a portion of such a tool showing elastic rods 35 corrugated in two mutually perpendicular planes.

Figure 21:
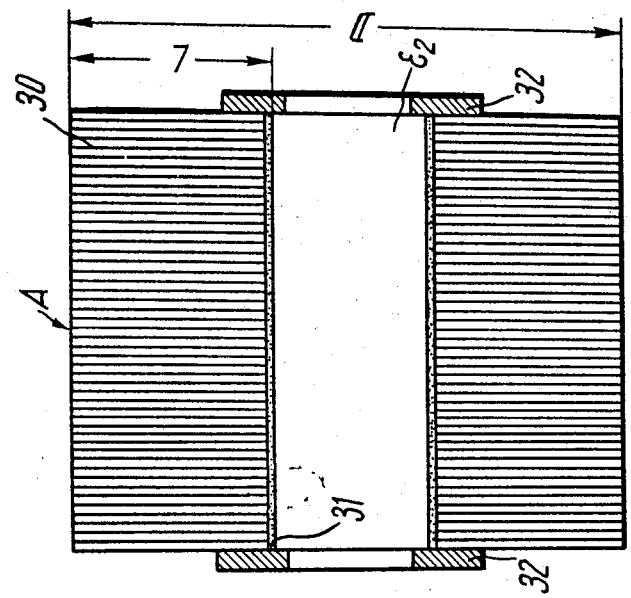
FIG. 21 is a longitudinal-section view of a tool having the cutting elements made as elastic rods, according to the invention.

It should be pointed out that the tools diagrammatically shown in FIGS. 20 and 21, as well as the gang of FIG. 22 may have cutting elements made of elastic rods or of corrugated elastic rods.

Such tools are expedient to be used in machining low-carbon steels and non-ferrous metals featuring the Vickers hardness number not above 200.

When machining cast items having on their surface casting skin that possesses abrasive properties, said tools are practicable to comprise cutting elements reinforced with high-speed cutting material. In machining metals or materials of high-hardness or in cases where small amount of metal stock is to be removed, in conjunction with higher requirements to the quality of surface finish obtained, use should be made of cutting elements from elastic rods reinforced with an abrasive material.

It is most frequently that plastic materials are used in said tools as spacers, however it is not quite impossible to employ spacers made as stops from rods shorter than the cutting elements.

To machine tough materials or for rough cutting operations, it is expedient to use a tool, wherein slots G (FIG. 24) are provided on the common cutting surface $A_5$ thereof, such a tool consists of a gang 36 with cover plates 37.

The tool may incorporate one or more such gangs as the gang 36 which is held in between a body 38 and a cover 39 by means of bolts 40.

The slots G pass over the common tool cutting surface $A_5$ from one of the tool end faces towards the other; they may be of various configurations and be diversely arranged with respect to the axis OO of the tool rotation. FIGS. 22 and 23 illustrate a portion of the tool cutting surface showing the slots $G_1$ and $G_2$ passing thereover.

The slots G, $G_1$ and $G_2$ are so made as if they divide the tool cutting surface, thereby making better the conditions of chip disposal from the surface being machined and those of cooling the latter.

Disclosed in the present description are of the possible construction solutions of the cutting elements of the proposed rotary cutting tool, as well as their possible arrangements in a group and in a gang of groups.

All such constructional versions, as experiments have shown, are conducive to the formation of a durable tool common cutting surface, impart high cutting ability thereto and enable the tool to machine workpieces and materials at a high quality of surface finish and high production capacity.

As experiments have shown, we have been successful in producing a self-sharpening tool capable of continuously working over 2,000 hours without being resharpened, cutting off a layer of material from several microns to a few millimetres from the surface being machined and produced a high quality of surface finish. Inasmuch as the cutting elements are arranged regularly on the cutting surface of the proposed tool, the latter is easily reversible, i.e., the direction of its rotation can be reversed without impairing the productive capacity or the quality of surface finish obtained. Besides, the present tool features long service life, is impact resistant and is not liable to breaking.

All these advantageous features render the tool indispensable for automated production processes and machines.

Moreover, the herein-disclosed tool, due to its constructional features, is able to machine hot metals and such materials that cannot be machined with the known abrasive tools, since said materials are liable to glaze the surface of said abrasive tools.

What we claim is:

1. A rotary cutting tool for machining the surface of workpieces and materials, comprising at least one group of radially arranged elastic cutting elements connected to one another with one of the ends thereof forced against one another at their flanks in a close proximity to their interconnected ends, opposite free ends of said cutting elements adjoining the tool common cutting surface shaped as a surface of revolution, free ends of said cutting elements on the tool common cutting surface, when in free state, being spaced from one another at some distance in such a manner that within the zone where the adjacent free ends of said cutting elements engage each other due to one of their being deflected at the moment of cutting, said distance being of a value which, when taken as the average for all such distances in the tool, is smaller than the thickness of the cutting element nearby the fixed end thereof.

2. A tool according to claim 1, wherein the cutting elements are corrugated, the corrugations being disposed at least in one direction parallel to the axis of the tool rotation.

3. A tool according to claim 1, wherein each cutting element is constructed as an elastic plate, the length of said elastic plate being calculated according to the following formula:

$$l \leq D/[(2\delta/\Delta) + 2],$$

wherein
$l$ is length of elastic plate,
$D$ is diameter of the tool common cutting surface,
$\delta_1$ is thickness of elastic plate nearby the tool common cutting surface,
$\Delta$ is distance between the free ends of the adjacent elastic plates within the zone of their contact with each other at the moment of cutting.

4. A tool according to claim 1, wherein each cutting element is made as an elastic rod, the length of said elastic rod being calculated according to the following formula:

$$L = kD/[(\delta_1/\Delta) + 2]$$

wherein
$L$ is length of elastic plate,
$D$ is diameter of tool common cutting surface,
$\delta_1$ is thickness of elastic rod nearby the tool commong cutting surface within the zone of contact of the adjacent free ends of rods at the moment of cutting,
$\Delta$ is distance between the free ends of the adjacent elastic rods within the zone of their contact with each other at the moment of cutting,
$k$ is numerical factor adopted to range from 0.7 to 1.2.

5. A rotary cutting tool for machining the surface of workpieces or materials, comprising at least one group of radially arranged elastic cutting elements connected to one another at one of the ends thereof and forced against one another with their flanks in a close proximity to their interconnected ends, free ends of said cutting elements adjoining the tool common cutting surface being shaped as a surface of revolution, said free ends of said cutting elements on the tool common cutting surface, when in free state, being spaced from one another at some distance in such a manner that within the zone where the adjacent free ends of said cutting elements engage each other due to one of them being deflected at the moment of cutting, said distance being of a value which, when taken as the average for all such distances in the tool, is smaller than the thickness of the cutting element nearby the fixed end thereof, and having means adapted to restrict the value of said deflection of the free ends of said cutting elements at the moment of cutting, each of said means being disposed between adjacent cutting elements.

6. A tool according to claim 5, wherein all the cutting elements are corrugated, the corrugations being disposed at least in one direction parallel to the axis of the rotation of the tool.

7. A tool according to claim 5, wherein each means adapted to restrict the value of the deflection is essentially a projecting stop provided on the side surface of the free end of the cutting element.

8. A tool according to claim 5, wherein each means adapted to restrict the value of the deflection is essentially a spacer placed between adjacent cutting elements.

9. A tool according to claim 5, wherein the means adapted to restrict the value of the deflection of the free ends of adjacent cutting elements at the moment of cutting is essentially plastic material, said plastic material being adapted to fill gaps between said adjacent cutting elements at least partly along their length in free state thereof.

10. A rotary cutting tool for machining the surface of workpieces or materials, comprising at least one group of radially arranged elastic cutting elements connected to one another at one end thereof and forced against one another with their flanks in a close proximity to their interconnected ends, free ends of said cutting elements adjoining the tool common cutting surface being shaped as a surface of revolution, said free ends of said cutting elements on the tool common cutting surface, when in free state, being spaced from one another at some distance in such a manner that within the zone where the adjacent free ends of said cutting elements engage each other due to one of them being deflected at the moment of cutting, said distance being of a value which, when taken as the average for all such distances in the tool, is smaller than the thickness of the cutting element nearby the fixed end thereof, and having means adapted to supplement the cutting ability of each of said cutting elements.

11. A tool according to claim 10, wherein all the cutting elements are corrugated, said corrugations being disposed at least in one direction parallel to the axis of rotation of the tool.

12. A tool according to claim 10, wherein each cutting element has its free end reinforced with a high-speed cutting material, thus supplementing the cutting ability of the tool.

13. A tool according to claim 10, wherein each cutting element has its free end tipped with an abrasive material to increase the cutting ability of the tool.

14. A tool according to claim 10, wherein each of said cutting elements is essentially a pair of elastic plates fixed to each other and serving as coverings for a middle plate made of an abrasvie material, thereby increasing the cutting ability of the tool.

15. A rotary cutting tool for machining the surface of workpieces or materials, comprising at least one group of radially arranged elastic cutting elements connected to one another with their flanks in a close proximity to their interconnected ends, free ends of said cutting elements adjoining the tool common cutting surface shaped as a surface of revolution, said free ends of said cutting elements on the tool common cutting surface, when in free state, being spaced from one another at some distance in such a manner that within the zone where the adjacent free ends of said cutting elements engage each other due to one of them being deflected at the moment of cutting, said distance being of a value which, when taken as the average for all such distances in the tool, is smaller than the thickness of the cutting element nearby the fixed end thereof; and having means adapted to restrict the amount of deflection of the free ends of said cutting elements at the moment of cutting, each of said means being disposed between adjacent cutting elements, and means adapted to contribute to the cutting ability of each of said cutting elements.

16. A tool according to claim 15, wherein all the cutting elements are corrugated, said corrugations being disposed at least in one direction parallel to the axis of the rotation of the tool.

17. A rotary cutting tool for machining the surface of workpieces or materials, comprising a set of groups of radially arranged elastic plates serving as cutting elements and made fast to one another within each of said groups with their ends and forced against one another with their flanks in a close proximity to their interconnected ends, free ends of said elastic plates, opposite to those made fast, adjoining the tool common cutting surface shaped as a surface of revolution, said free ends of said elastic plates on the tool common cutting surface, when in free state, being spaced from one another at some distance in such a manner that within the zone where the adjacent free ends of said elastic plates engage each other due to one of them being deflected at the moment of cutting, said distance being of a value which, when taken as the average for all such distances in the tool, is smaller than the thickness of said elastic plate nearby the fixed end thereof; said elastic plates forming by their interconnected ends cylindrical cavities corresponding their number to that of said groups in the set and adapted to accommodate the tool on the machine spindle to impart rotation to the former; said cylindrical cavilites being disposed successively along the axis of rotation of the tool and spaced from one another at a predetermined distance; the free ends of said elastic plates forming a common cutting surface of a width equal to that of the free end of one of said elastic plates.

18. A tool according to claim 17, wherein all the cutting elements, i.e. elastic plates, are made corrugated, said corrugation being disposed only in one direction parallel to the axis of rotation of the tool.

19. A rotary cutting tool for machining the surface of workpieces or materials, comprising a set of groups of radially arranged elastic plates serving as cutting elements and connected to one another within each of said groups with their ends and forced against one another with their flanks in close proximity to their interconnected ends, the free ends of said elastic plates, opposite to those made fast, adjoining the tool common cutting surface shaped as a surface of revolution, said free ends of said elastic plates on the tool common cutting surface, when in free state, being spaced from one another at a distance in such a manner that within the zone where the adjacent free ends engage each other due to one of them being deflected at the moment of cutting, said distance being of a value which, when taken as the average for all such distances in the tool, is smaller than the thickness of said elastic plate nearby the fixed end thereof; said free ends of the elastic plates having a width that is greater than and multiple to the width of their interconnected ends; said interconnected elastic plates forming by their interconnected ends cylindrical cavities corresponding in their number to that of said groups in the set and adapted to accommodate the tool on the machine spindle to impart rotation to the former; said cylindrical cavities adjoining one another along the axis of rotation of the tool; the width of the common cutting surface of the tool equalling the total length of the cylindrical cavities or being greater than it by a value equal to that of the free end of one of said elastic plates.

20. A tool according to claim 19, wherein all the cutting elements, i.e. elastic plates, are corrugated, said corrugations being disposed only in one direction parallel to the axis of rotation of the tool.

21. A rotary cutting tool for machining the surface of workpieces or materials, comprising essentially a set of a pair of groups of radially arranged elastic rods of same length, serving as cutting elements, connected to one another with one of the ends thereof within each of said groups and forced against one another with their flanks in a close proximity to their interconnected ends; the free ends of said elastic rods, opposite to those made fast, adjoining the tool common cutting surface shaped as a surface of revolution; said free ends of said elastic rods on the tool common cutting surface, when in free state, being spaced from one another at a distance in such a manner that within the zone where the adjacent free ends engage each other due to one of them being deflected at the moment of cutting, said distance being of a value which, when taken as the average for all such distances in the tool, is smaller than the thickness of said elastic rod nearby the fixed end thereof; said elastic rods forming in said set with their fixed ends a cavity of the globoidal shape, while the free ends of said elastic rods in each group of the set being inclined to its place of symmetry perpendicular to the axis of the tool rotation at an angel $\alpha_x$ which is found from the following formula: $\alpha_x = 2 \arcsin [b_x(D\phi - D_1 \phi_1)/4D_1 \phi_1 L]$, wherein $D_1 = D - 2L$ $b_x$ = distance between axes of elastic rods from a group, disposed symmetrically relative to the plane of symmetry of the set, $D$ = diameter of common cutting surface, $L$ = length of elastic rod, $\phi$ = ratio of the sum total of the areas of faces of the free ends of elastic rods on tool cutting surface to the total area of tool cutting surface, $\phi_1$ = is ratio of the sum total of the areas of faces of the interconnected ends of elastic rods to the total area of the side surface of the cavity formed by the interconnected ends.

22. A tool according to claim 21, wherein all the cutting elements, i.e. elastic rods, are corrugated, said corrugations being disposed in the direction parallel to the axis of the tool rotation and in the direction perpendicular to this axis.

23. A rotary cutting tool for machining the surface of workpieces or materials, comprising essentially a set of groups of radially arranged elastic rods serving as cutting elements connected to one another with one of the ends thereof and forced against one another with their flanks in a close proximity to their interconnected ends, the free ends of said elastic rods, opposite to those made fact, adjoining the tool common cutting surface shaped as a surface or revolution; said free ends of said elastic rods on the tool common cutting surface, when in free state, being spaced from one another at a distance in such a manner that within the zone where the adjacent free ends get in touch with each other due to one of them being deflected at the moment of cutting, said distance being of value which, when taken as the average for all such distances in the tool, is smaller than the thickness of said elastic rod nearby the fixed end thereof; said elastic rods forming within said set by their interconnected ends a single cylindrical cavity, the diameter of said common cutting surface of the tool being determined from the following formula:

$$D = L \frac{2}{1 - \frac{\varphi}{\varphi_1}},$$

wherein $D$ is diameter of common cutting surface, $L$ is length of elastic rod, $\varphi$ is ratio of the sum total of the areas of faces of free ends of the elastic rods on the tool cutting surface to the total area of the tool cutting surface, $\varphi_1$ is ratio of the sum total of the areas of faces of interconnected ends of elastic rods to the total area of the side surface of the cavity formed by these interconnected ends.

24. A tool according to claim 23, wherein the length of said single cylindrical cavity ranges from 0.80 to 0.97 of the width of its cutting surface.

25. A tool according to claim 23, wherein all the cutting elements, i.e. elastic rods, are corrugated, said corrugations being disposed in two mutually perpendicular directions relative to the axis of the tool rotation.

26. A rotary cutting tool for machining the surface of workpieces or materials, comprising at least one group of radially arranged elements; connected to one another with on of the ends thereof and forced against one another with their flanks in a close proximity to their interconnected ends, opposite free ends of said cutting elements adjoining the tool common cutting surface shaped as a surface of revolution, said free ends of said cutting elements on the tool common cutting surface, when in free state, being spaced from one another at a distance in such a manner that within the zone where the adjacent free ends of said cutting elements engage each other due to one of them being deflected at the moment of cutting, said distance being of a value which, when taken as the average for all such distances in the tool, is smaller than the thickness of the cutting element nearby the fixed end thereof; and having slots made on said common cutting surface of the tool and extending from one face thereof to the other one.

* * * * *